United States Patent [19]

Suzuki et al.

[11] Patent Number: 4,669,569
[45] Date of Patent: Jun. 2, 1987

[54] FOUR-WHEEL DRIVE SYSTEM WITH DIFFERENTIAL CONTROL RESPONSE TO TIRE-TO-TIRE FRICTION

[75] Inventors: Kunihiko Suzuki, Sagamihara; Koji Enomoto, Ebina, both of Japan

[73] Assignee: Nissan Motor Co., Ltd., Japan

[21] Appl. No.: 892,899

[22] Filed: Aug. 1, 1986

Related U.S. Application Data

[63] Continuation of Ser. No. 589,776, Mar. 15, 1984, abandoned.

[30] Foreign Application Priority Data

Apr. 4, 1983 [JP] Japan .................................. 58-58984

[51] Int. Cl.$^4$ ............................................ B60K 17/34
[52] U.S. Cl. ..................................... 180/249; 74/710.5
[58] Field of Search ............... 180/248, 249, 250, 197; 74/711, 710.5; 192/0.076, 0.075; 340/580, 601, 602; 364/424, 426

[56] References Cited

U.S. PATENT DOCUMENTS

| 3,548,980 | 12/1970 | Schmidt | 192/3.58 X |
| 3,756,358 | 9/1973 | Espenschied et al. | 192/3.58 X |
| 3,897,846 | 9/1975 | Inoue | 180/142 |
| 3,967,862 | 7/1976 | Hunter et al. | 180/197 |
| 4,070,924 | 1/1978 | Moreno et al. | 74/710.5 |
| 4,072,220 | 2/1978 | Hamada | 192/0.076 X |
| 4,075,538 | 2/1978 | Plunkett | 180/197 X |
| 4,298,085 | 11/1981 | Moroto et al. | 180/249 X |
| 4,320,813 | 3/1982 | Manna | 180/249 |
| 4,333,004 | 6/1982 | Forgue et al. | 340/580 X |
| 4,363,389 | 12/1982 | Zaunberger et al. | 192/0.076 X |
| 4,369,671 | 1/1983 | Matsumoto et al. | 74/740 X |
| 4,417,641 | 11/1983 | Kageyama | 180/247 |
| 4,441,572 | 4/1984 | Ito et al. | 180/140 |
| 4,467,886 | 8/1984 | DeClaire | 180/197 |
| 4,470,489 | 9/1984 | Makita | 180/76 X |
| 4,484,654 | 11/1984 | Hayakawa | 74/867 X |

FOREIGN PATENT DOCUMENTS 0076148 4/1984 European Pat. Off. ............ 180/148

Primary Examiner—Harry Tanner
Attorney, Agent, or Firm—Lane and Aitken

[57] ABSTRACT

A four-wheel drive system has a center differential between front and rear wheels, and means for restraining or locking the center differential. The four-wheel drive system is equipped with an automatic control system for automatically locking the center differential when a coefficient of friction between a road surface and a tire of at least one wheel is equal to or lower than a predetermined value. The coefficient of friction is determined by sensing a steering angle, a vehicle speed, a normal load and a steering force, or by sensing an ambient temperature and a humidity. The control system may be arranged to lock the center differential only when the vehicle speed is equal to or lower than a predetermined speed.

18 Claims, 10 Drawing Figures

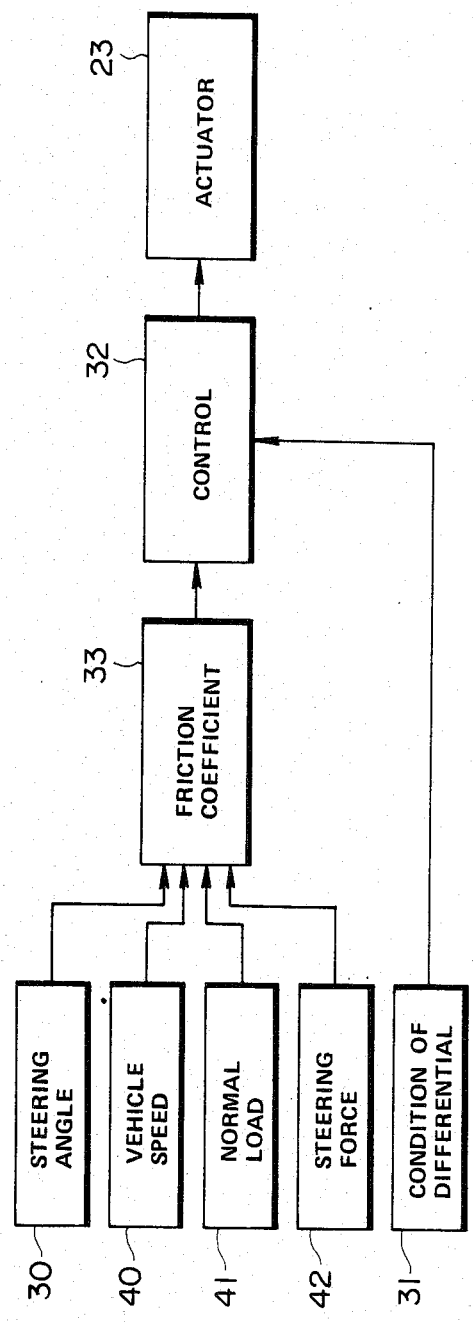
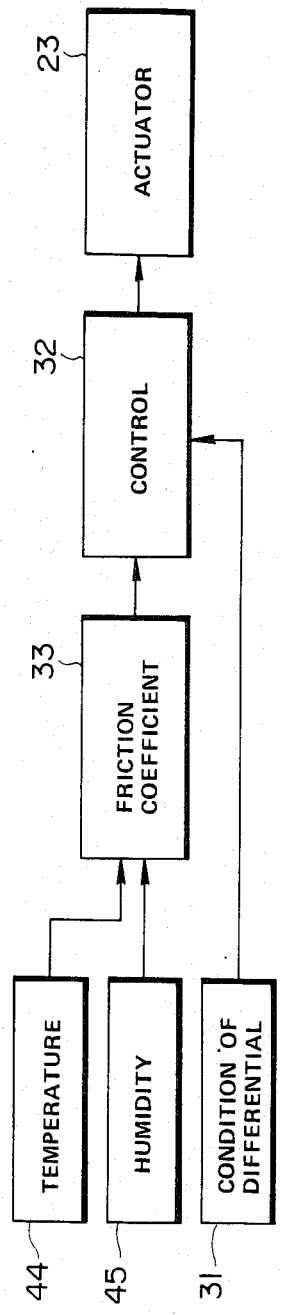

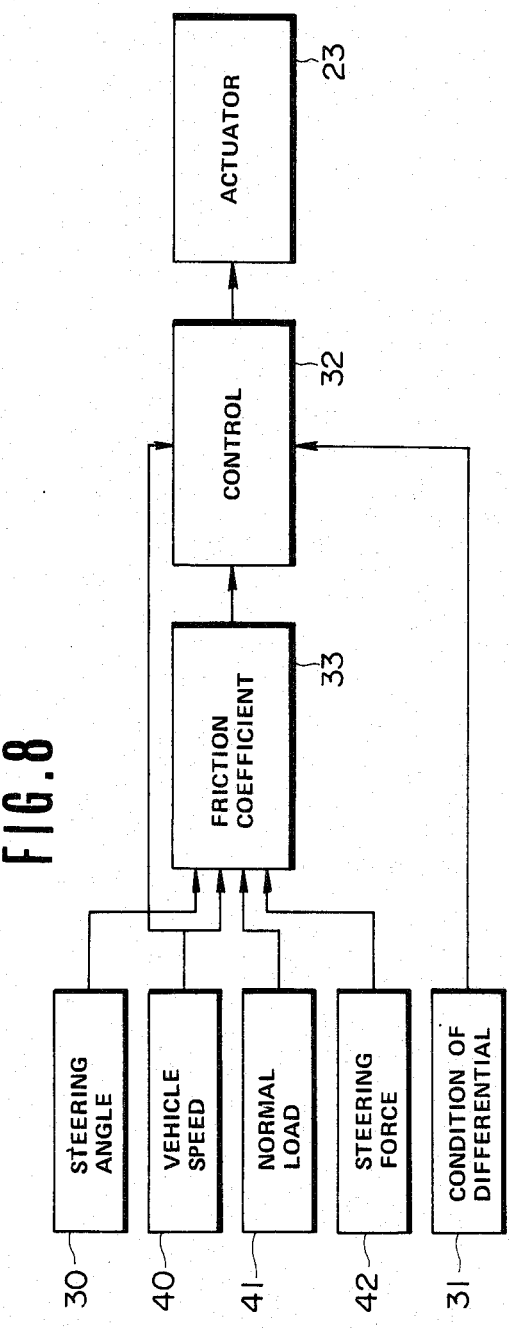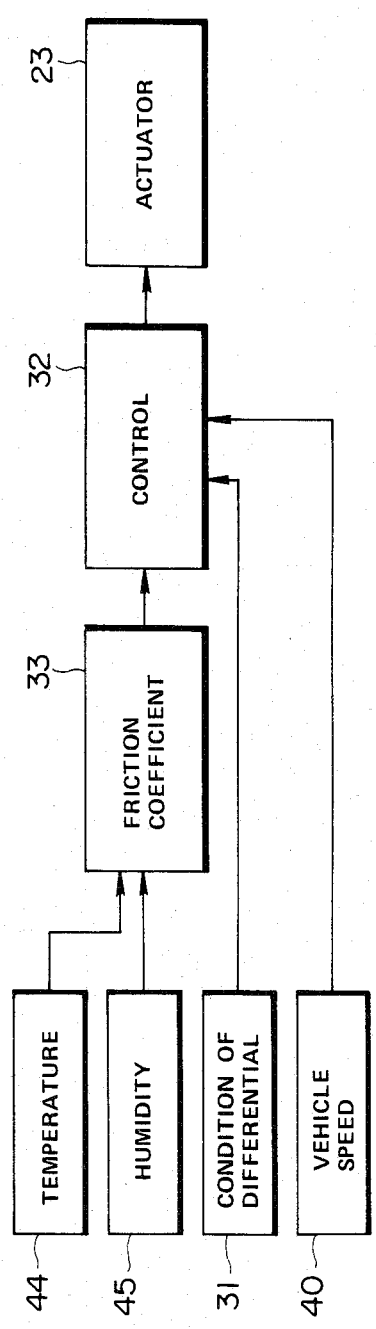

FOUR-WHEEL DRIVE SYSTEM WITH DIFFERENTIAL CONTROL RESPONSE TO TIRE-TO-TIRE FRICTION

This application is a continuation of application Ser. No. 589,776, filed Mar. 15, 1984, now abandoned.

BACKGROUND OF THE INVENTION

The present invention relates to a four-wheel drive motor vehicle of a type having a center differential between the front and rear wheels, and means for restraining or locking the center differential. More specifically, the present invention relates to an automatic control system for restraining or locking a center differential of a four-wheel drive system in accordance with a coefficient of friction between a road surface and a tire of the vehicle.

A four-wheel drive vehicle is superior in ability of hill climbing and ability of rough road driving. Even when a coefficient of friction between the tires and road surface is low, a four-wheel drive vehicle is very stable, as compared with a two-wheel drive vehicle, because the four wheels produce a frictional driving force, and accordingly the tires are prevented from sliding on the road surface. If, however, all four wheels are always driven at the same speed, a four-wheel drive vehicle cannot be turned smoothly. During a turn with large steering angles of steerable wheels, the front wheel of an inner or outer side must travel along a circle having a large radius and the rear wheel of the same side must travel along a small circle. Because of this difference in turning radius, there arises a large difference between a rotation speed (an average rotation speed, to be exact) of the front wheels and a rotation speed (an average rotation speed) of the rear wheels. As a result, the steering becomes heavy, the tendency to understeer is increased, and the vehicle cannot be turned without abnormal tire friction (called tight corner brake) which tends to brake the vehicle and cause an engine stall.

To overcome these handling and tire friction problems, some four-wheel drive systems use a center differential between front and rear wheels. If, however, one of the four wheels run on a muddy place, the center differential coacts with a rear or front differential between right and left wheels, so that the torque cannot be transmitted to the other three wheels, and the vehicle cannot escape from the muddy place.

In view of this problem, some four-wheel drive systems are further provided with means (a lockup mechanism or a non-slip differential mechanism) for restraining or preventing the action of the center differential. One example is shown in Japanese patent provisional publication No. 57-114727.

If, however, such a four-wheel drive vehicle with its center differential in the released state runs on a slippery road surface where the coefficient of friction is low, then the individual tires of the vehicle tend to slide separately on the slippery road surface through the action of the center differential, so that the vehicle stability during running and braking is reduced.

SUMMARY OF THE INVENTION

It is an object of the present invention to provide a four-wheel drive vehicle of a type having a center differential, which can provide an excellent vehicle stability during running and braking without the need of skill of the driver.

According to the present invention, a four-wheel drive vehicle comprises an engine, front and rear wheels, a four-wheel drive system for transmitting power from the engine to the front wheels and the rear wheels, and a control system. The four-wheel drive system comprises a center differential connected between the front wheels and the rear wheels for absorbing a rotational speed difference between the front wheels and the rear wheels, and differential restraining means capable of bringing the center differential into a restrained condition in which the function of the center differential is restrained. The control system comprises friction coefficient sensing means for sensing a coefficient of friction between a road surface and a tire of at least one of the wheels, condition sensing means for detecting whether the center differential is in or out of the restrained condition, and control means, connected with the friction coefficient sensing means and the condition sensing means, for controlling the center differential by actuating the differential restraining means in accordance with signals of the friction coefficient sensing means and the condition sensing means. The control means is arranged to command the differential restraining means to bring the center differential into the restrained condition if the sensed coefficient of friction is equal to or lower than a predetermined coefficient value and at the same time the center differential is out of the restrained condition.

BRIEF DESCRIPTION OF THE DRAWINGS

FIG. 4 is a block diagram of a control system of the first embodiment, FIG. 6 is a block diagram of a control system of the second embodiment, FIG. 8 is a block diagram of a control system of the third embodiment, FIG. 10 is a block diagram of a control system of the fourth embodiment.

DETAILED DESCRIPTION OF THE INVENTION

Figure 2:
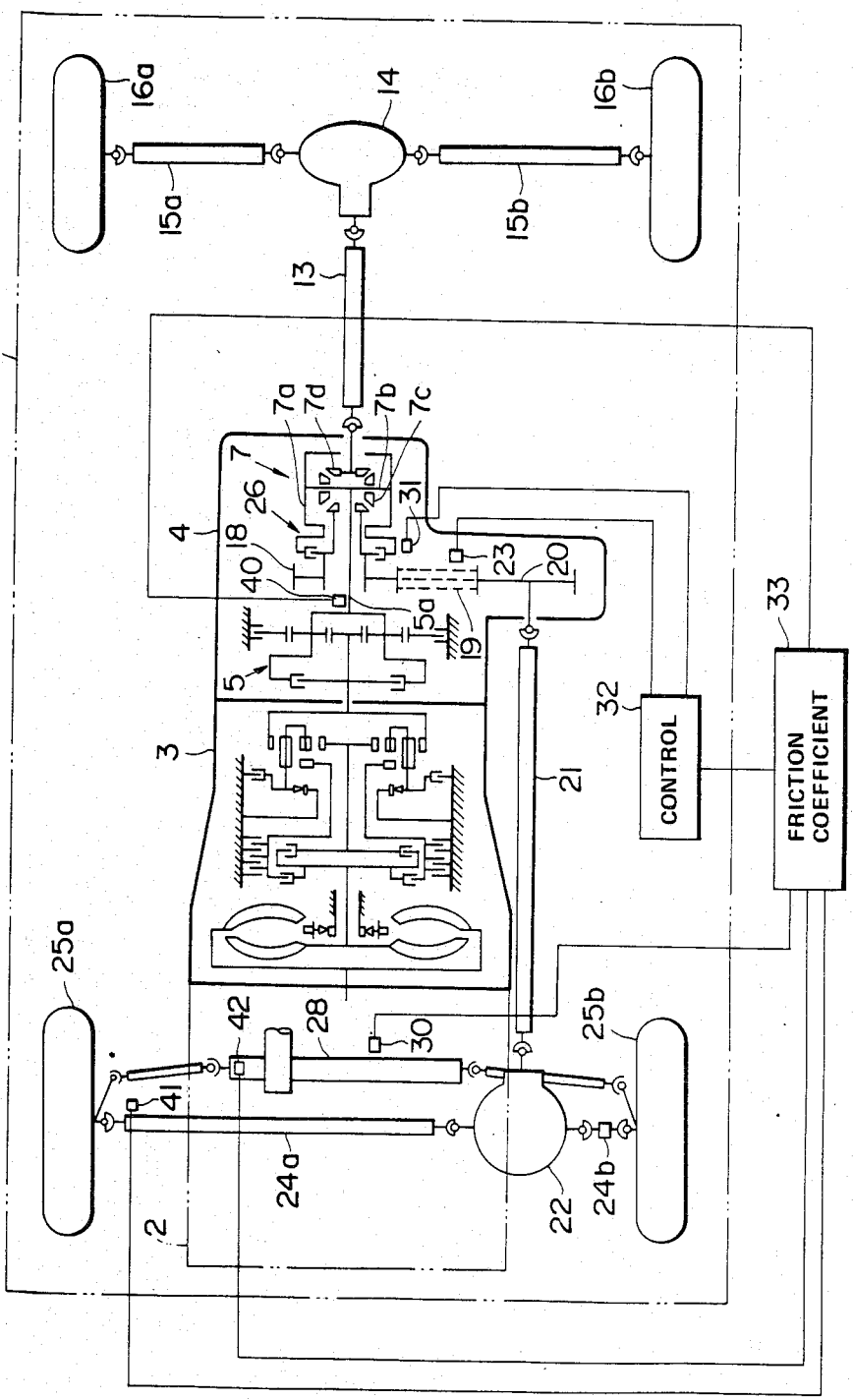
FIG. 2 is a schematic view of a four-wheel drive vehicle of a first embodiment of the present invention.

A first embodiment of the present invention is shown in FIG. 2. An engine 2 is supported on a vehicle body 1. The engine is connected to a main transmission 3. The main transmission 3 is connected to a secondary transmission 4. The secondary transmission 4 has a high-low two-speed change unit 5. The main transmission 3 is connected to the high-low change unit 5 of the secondary transmission 4. The high-low change unit 5 has an output shaft 5a.

There is provided a vehicle speed sensor 40 mounted on the vehicle body 1 near the output shaft 5a of the high-low change unit 5. The vehicle speed sensor 40 senses the speed of the vehicle by sensing the rpm of the output shaft 5a.

The secondary transmission 4 further has a center differential unit 7. The output shaft 5a of the high-low unit 5 is connected to the center differential unit 7. The center differential unit 7 has a differential case 7a, a pinion shaft 7b fixed to the differential case 7a, two differential pinions 7c rotatably mounted on the pinion shaft 7b, and first and second side gears 7d which mesh with the differential pinions 7c. The first side gears 7d is connected to one end of a rear propeller shaft 13. The other end of the rear propeller shaft 13 is connected with a rear differential unit 14. The rear differential unit 14 is connected to rear wheels 16a and 16b through rear axle shafts 15a and 15b. The rear differential unit 14 allows the right and left rear wheels 16a and 16b to rotate at different speeds, and thereby absorbs a rotational speed difference between the right and left rear wheels 16a and 16b.

The second side gear 7d of the center differential unit 7 is connected with a first chain wheel 18 placed coaxially with the second side gear 7d. The first chain wheel 18 is connected with a second chain wheel 20 by a chain belt 19. A shaft of the second chain wheel 20 is connected with one end of a front propeller shaft 21. The other end of the front propeller shaft 21 is connected to a front differential unit 22. The front differential unit 22 is connected with front wheels 25a and 25b through front axles 24a and 24b, respectively. The front differential unit 22 allows the right and left front wheels 25a and 25b to rotate at different speeds, and thereby absorbs a rotational speed difference between the right and left front wheels 25a and 25b.

There is provided a normal load sensor 41 mounted on the vehicle body 1 near the front wheel 25a. The normal load sensor 41 senses, by estimate, a force acting in a vertical direction on the contact surface between the tire of the front wheel 25a and the road.

Figure 3:
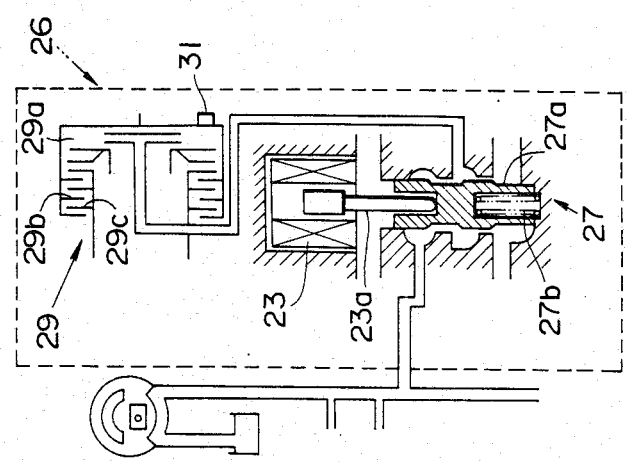
FIG. 3 is a fragmentary sectional schematic view of a center differential restraining means used in the vehicle of FIG. 2.

The secondary transmission 4 further has a center differential restrain unit 26 disposed between the differential case 7a of the center differential unit 7 and the first chain wheel 18. As shown in FIG. 3, the center differential restrain unit 26 has a center differential control valve 27 connected with a hydraulic system of the vehicle such as the hydraulic system of the transmission 3. The center differential control valve 27 has a spool 27a and a spring 27b. The center differential restrain unit 26 has a solenoid 23 having an iron core 23a for moving the spool 27a against the force of the spring 27b. The solenoid 23 serves as an actuator of a control system. The center differential restrain unit 26 further has a hydraulic type multiple disc clutch 29. The clutch 29 is operated by an oil pressure of an oil chamber 29a. The oil chamber 29a is fluidly connected with a port of the center differential control valve 27. The multiple disc clutch 29 has a group of first clutch plates 29b and a group of second clutch plates 29c. One of the two groups is connected with the differential case 7a of the center differential unit 7. The other is connected with the first chain wheel 18. The center differential control valve 27 can move the spool 27a with the iron core 23a in accordance with the current passing through the solenoid 23, and thereby control the fluid pressure in the oil chamber 29a by controlling the fluid flow. The clutch 29 is frictionally engaged when the oil pressure in the oil chamber 29a is high. The clutch 29 is in a slipping state when the oil pressure in the oil chamber 29a is low. The clutch 29 is disengaged when the oil is drained from the oil chamber 29a.

The vehicle further has a steering means or mechanism 28 connected with the steerable front wheels 25a and 25b. The steering means 28 is moved by a steering wheel of the vehicle (not shown).

There is provided a steering force sensor 42 disposed in the steering means 28. The steering force sensor senses a steering force produced through a power steering system or other device by the movement of the steering wheel of the vehicle.

There is provided a steering angle sensor 30 mounted on the vehicle body 1 near the steering means 28. The steering angle sensor 30 senses steering angles of the front wheels 25a and 25b by sensing the movement of the steering mechanism 28.

There is further provided a sensor 31 for detecting the condition of the center differential 7. In this embodiment, the differential condition sensor 31 detects whether the clutch 29 is engaged or not by monitoring the oil pressure in the oil chamber 29a.

There is further provided a friction coefficient determining unit 33. As shown in FIG. 4, the friction coefficient determining unit 33 is connected with the steering angle sensor 30, the vehicle speed sensor 40, the normal load sensor 41 and the steering force sensor 42 so as to receive signals from these sensors. From the signals of these sensors 30, 40, 41 and 42, the friction coefficient determining unit 33 calculates the coefficient of friction between the tire of the steerable wheel 25a and road surface.

The coefficient of friction between the tire and road surface can be calculated in the following manner. The following is an equation (quated from Jidosha Kogaku Hand Book (Automotive Engineers' Hand Book) compiled by Society of Automotive Engineers of Japan, 1981, p.8-16) for obtaining a moment M which rotates or tends to rotate a steerable wheel of a moving vehicle about its kingpin.

$$M = N \sin\zeta \sin\phi e \, (r + Rw \sin\zeta \cos\phi e) + \\ S \, Rw \sin\zeta \sin\phi e \cos\zeta + S \, Xs \cos\zeta + N f r \cos\zeta$$

In this equation,
N is a load acting in a vertical direction on a contact surface between the tire of the steerable wheel (25a) and the road,
r is a scrub radius,
Rw is an effective radius of the tire,
S is a force (side force) acting in a horizontal direction perpendicular to a direction of tire movement in the tire to road contact surface,
Xs is expressed by Xs=Tsat/S where Tsat is a self aligning torque,
f is the coefficient of friction between the tire of the steerable wheel (25a) and road surface,
$\zeta$ is expressed by $\tan^2\zeta = \tan^2\delta + \tan^2\beta$ wherein $\delta$ is a kingpin inclination (steering axis inclination), and $\beta$ is a caster angle, and
$\phi e$ is a steering angle of the steerable wheel (25a).

In this equation, r and Rw are quantities which are determined from the make (the specifications) of the vehicle. The quantity $\zeta$ is also known because $\delta$ and $\beta$ are determined by the make of the vehicle. The moment M is a quantity which is known from the steering force, so that the moment M can be determined by sensing the steering force. The load N is determined by the normal load sensor 41. The side force S is given by $S = Nf_s$ where $f_s$ is a coefficient of a sidewise sliding friction. The coefficient $f_s$ is a quantity varying with the vehicle speed, so that an approximate value of the side force S can be determined by the values sensed by the normal load sensor 41 and the vehicle speed sensor 40. The self aligning torque Tsat is known from the make of the vehicle and the steering angle of the steerable wheel. Therefore, an approximate value of Xs can be determine by sensing the steering angle of the steerable wheel, the vehicle speed, and the normal load. Finally, only the coefficient of friction f between the tire and road surface remain unknown in the above equation. Therefore, the friction coefficient determining unit 33 of the first embodiment is arranged to determine an approximate value of the coefficient of friction f between the tire and road surface from the signals from the steering angle sensor 30, the vehicle speed sensor 40, the normal load sensor 41 and the steering force sensor 42. The friction coefficient determining unit 33 sends a signal indicative of the result of the calculation to a control unit 32.

The control unit or circuit 32 is connected with the differential condition sensor 31 and the friction coefficient determining unit 33 for receiving signals from both. The control circuit 32 produces a control signal in accordance with the signals of the sensor 31 and the unit 33, and send the control signal to the solenoid (actuator) 23. Thus, a control system is formed as shown in FIG. 4.

Figure 1:
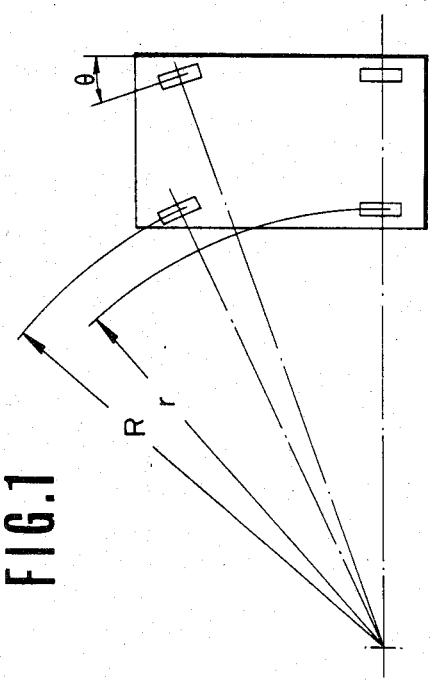
FIG. 1 is a plan view of a vehicle, for showing a turning radius difference between front wheels and rear wheels when steering angles of steerable wheels are large.

When the center differential restrain unit 26 is not actuated, the center differential unit 7 works in the following manner. When the steering angles θ of the steerable front wheels 25a and 25b are increased, the radii (R) of arc-shaped paths traveled by the front wheels 25a and 25b become largely different from the radii (r) of arc-shaped paths traveled by the rear wheels 16a and 16b, as shown in FIG. 1. In FIG. 1, only the paths of the inside front and rear wheels are shown. Consequently, there arises a large difference between the average rotation speed of the front wheels 25a and 25b and the average rotation speed of the rear wheels 16a and 16b. The center differential 7 in its released state absorbs this average rotation speed difference between the front and rear wheels, so that the vehicle can turn smoothly though the steering angles θ are large.

If the center differential 7 is held in the released state, and the vehicle runs on a road surface where the coefficient of friction between the tires and road surface is equal to or lower than a predetermined value due to rain or snow or some other reason, then the control unit 32 determines that the coefficient of friction between the tire and road surface is equal to or lower than the predetermined value, by receiving the signal from the friction coefficient determining unit 33. At the same time, the control unit 32 determines that the center differential 7 is held in the released state, by receiving the signal from the differential condition sensor 31. When the control unit 32 thus determines that the two conditions are satisfied, the control unit 32 sends its control signal to the actuator or solenoid 23 to commands the center differential restrain unit 26 to restrain the center differential 7. In response to the control signal of the control unit 32, the current supply to the solenoid 23 is gradually increased, and accordingly the center differential control valve 27 gradually increases the oil pressure in the oil chamber 29a by moving the spool 27a downwards in FIG. 3. When the oil pressure in the oil chamber 29a is gradually increased, the clutch 29 is brought into a slipping engagement condition, and a frictional force of the clutch 29 which acts to restrain the function of the center differential 7 is gradually increased. When the oil pressure of the oil chamber 29a finally reaches its maximum, the clutch 29 is completely engaged, and the center differential 7 is locked so that the function of the center differential 7 is completely prevented. This arrangement to engage the clutch 29 gradually with a slip can maintain the safety of the vehicle by preventing an abrupt change of the cornering behavior of the vehicle as mentioned later. In this way, the center differential 7 is locked by the restrain unit 26. As a result, each of the four wheels produces its own frictional driving force, so that the vehicle can run safely on the slippery road surface of a low coefficient of friction without the tires sliding on the road surface. Thus, the stability of the vehicle during running and braking is significantly improved. Furthermore, the vehicle of the present invention is very easy to handle for the average driver.

Figure 5:
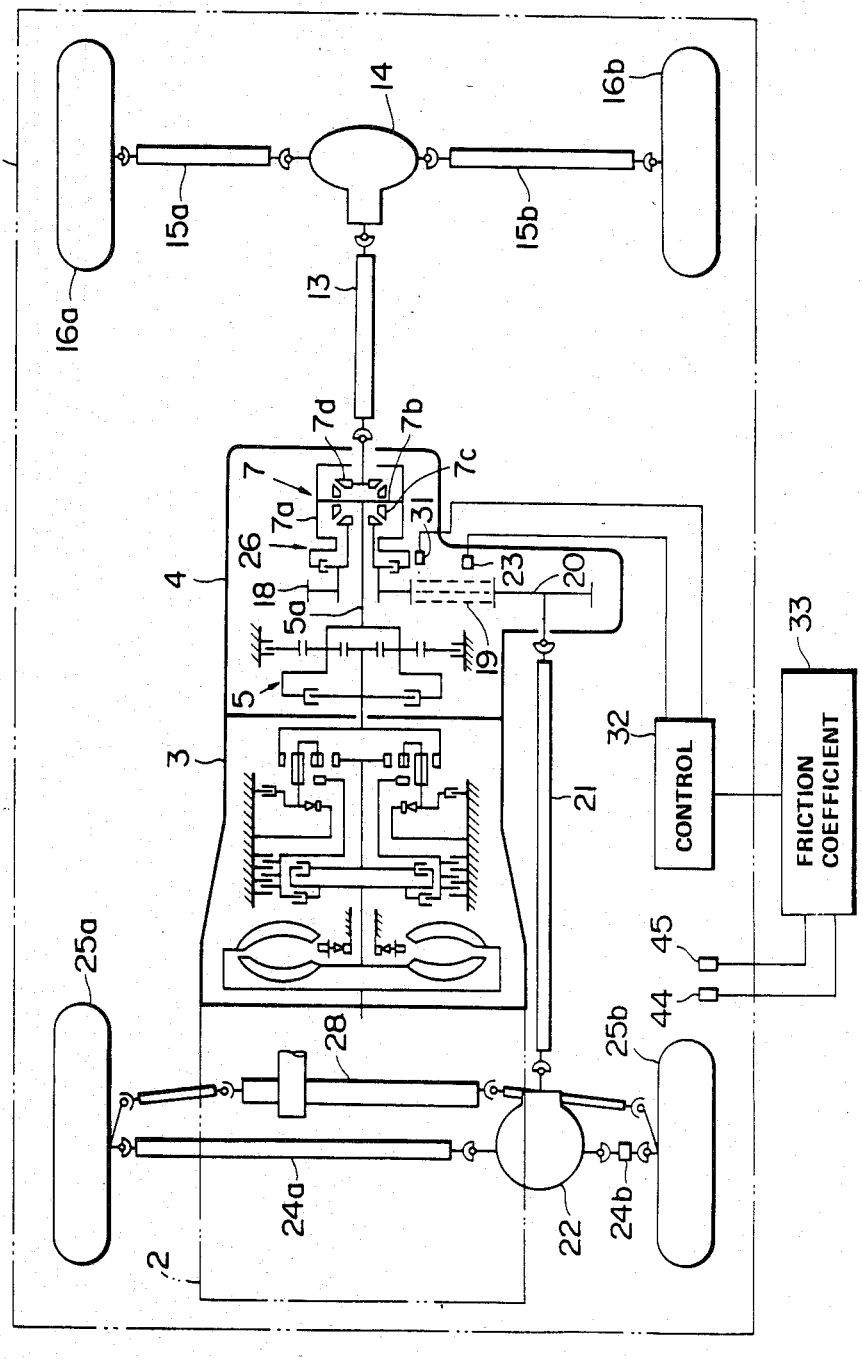
FIG. 5 is a schematic view of a four-wheel drive vehicle of a second embodiment of the present invention.

A second embodiment of the present invention is shown in FIG. 5. In the second embodiment, there are provided a temperature sensor 44 for sensing an ambient temperature, and a humidity sensor 45 for sensing a humidity of an ambient air, in place of the steering angle sensor 30, the vehicle speed sensor 40, the normal load sensor 41, and the steering force sensor 42 used in the first embodiment. When the ambient temperature is equal to or lower than a predetermined temperature value, there is a great possibility that the road is covered with snow or ice. When the humidity is high, there is a great possibility of rain or snow. In view of this, the temperature sensor 44 detects whether the ambient temperature is equal to or lower than a predetermined temperature value, and the humidity sensor 45 detects whether the humidity is equal to or higher than a predetermined humidity value. The temperature sensor 44 and the humidity sensor 45 is mounted on the vehicle body 1 near the road surface so that they can detect accurately the condition of the road surface. The temperature sensor 44 and the humidity sensor 45 are connected to the friction coefficient determining unit 33. Upon receipt of signals of the temperature and humidity sensors 44 and 45, the friction coefficient determining unit 33 estimates the coefficient of friction between the tires and the road surface, and determines whether the coefficient of friction is equal to or lower than a predetermined coefficient value. In the second embodiment, the temperature sensor 44, the humidity sensor 45 and the friction coefficient determining unit 33 constitute a friction coefficient sensing means. As shown in FIG. 6, the control unit 32 of the second embodiment is connected with the friction coefficient determining unit 33 and the center differential condition sensor 31 to receive signals therefrom. When the coefficient of friction between the tires and road surface is equal to or lower than the predetermined coefficient value, and at the same time the center differential 7 is not locked, the control unit 32 sends its control signal to the solenoid or actuator 23 of the center differential restrain unit 26 to command the center differential restrain unit 26 to lock the center differential 7. In the second embodiment, the number of the required sensors is small, and the circuitry of the control unit 32 can be simplified, so that the manufacturing cost can be reduced.

Figure 7:
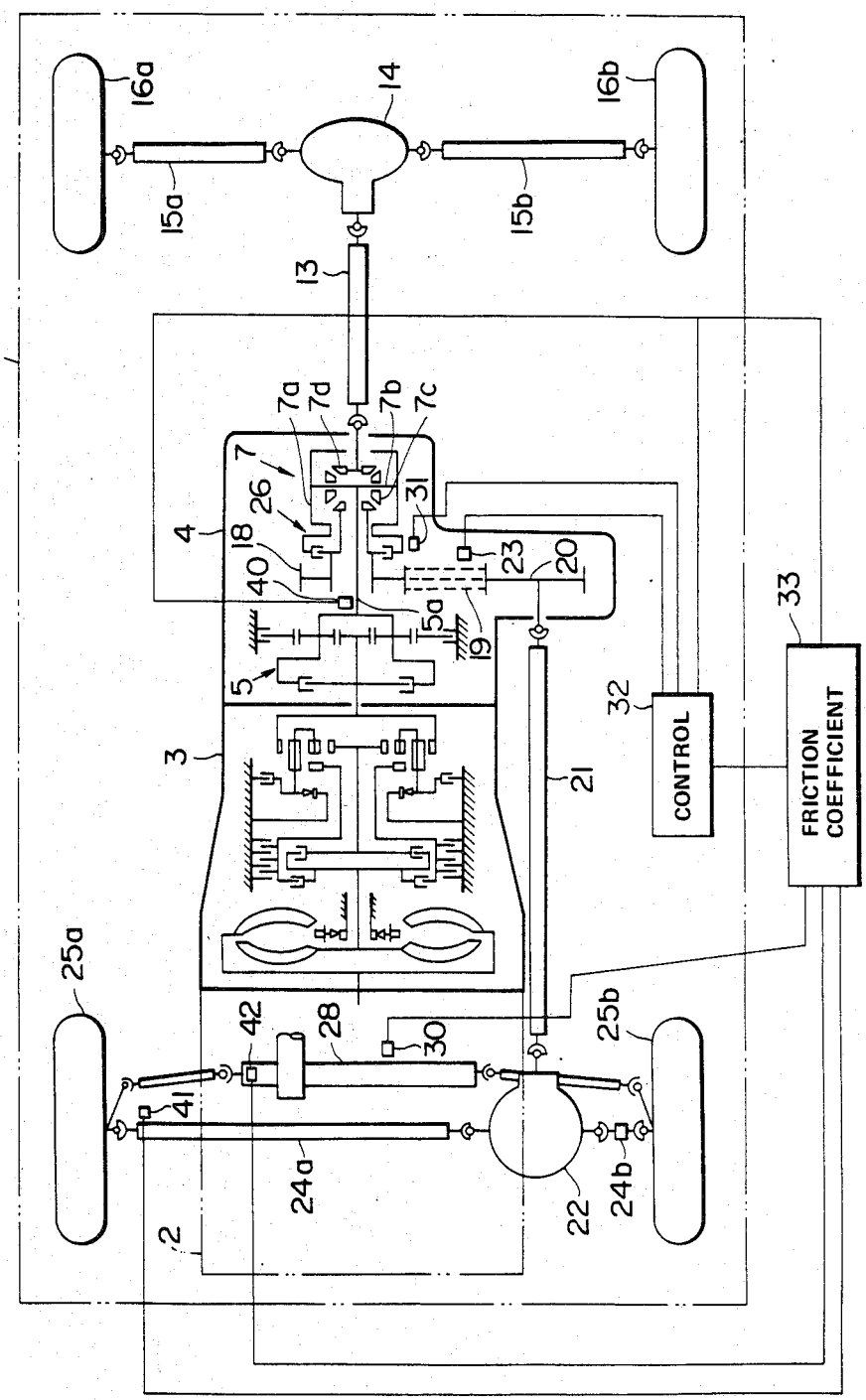
FIG. 7 is a schematic view of a four-wheel drive vehicle of a third embodiment of the present invention.

A third embodiment of the present invention is shown in FIG. 7. The third embodiment is different from the first embodiment in that the vehicle speed sensor 40 in the third embodiment is connected with not only the friction coefficient determining unit 33 but also the control unit 32. When the center differential 7 is not locked, it absorbs the rotational speed difference between the front and rear wheels, and accordingly the vehicle is turned in the condition of neutral steer (in which a vehicle turns with the turning radius which is determined inherently by a steering angle). When the center differential 7 is locked, the vehicle turns with the tendency to understeer due to the effect of the tight corner brake mentioned before. Thus, the cornering behavior of the vehicle is changed depending upon whether the center differential 7 is locked or not. If the cornering characteristics of the vehicle is changed while the vehicle is running at high speeds, there is a great possibility that the directional control of the vehicle is lost and the safety of the vehicle is endangered. In order to avoid such a danger, the control system of the third embodiment is arranged to change the condition of the center differential 7 only when the vehicle speed is equal to or lower than a predetermined speed value. As shown in FIG. 8, the control unit 32 of the third embodiment is connected with the friction coefficient determining unit 33, the center differential condition sensor 31, and the vehicle speed sensor 40 to receive the signals from them. The control unit 32 is arranged to sends its control signal to the actuator or solenoid 23 to restrain the center differential 7 only when the speed of the vehicle is equal to or lower than the predetermined value of the vehicle speed. Thus, the control system of the third embodiment can maintain the safety of the vehicle by preventing the center differential 7 from being changed from the unlocked state to the locked state when the vehicle speed is equal to or higher than the predetermined value.

Figure 9:
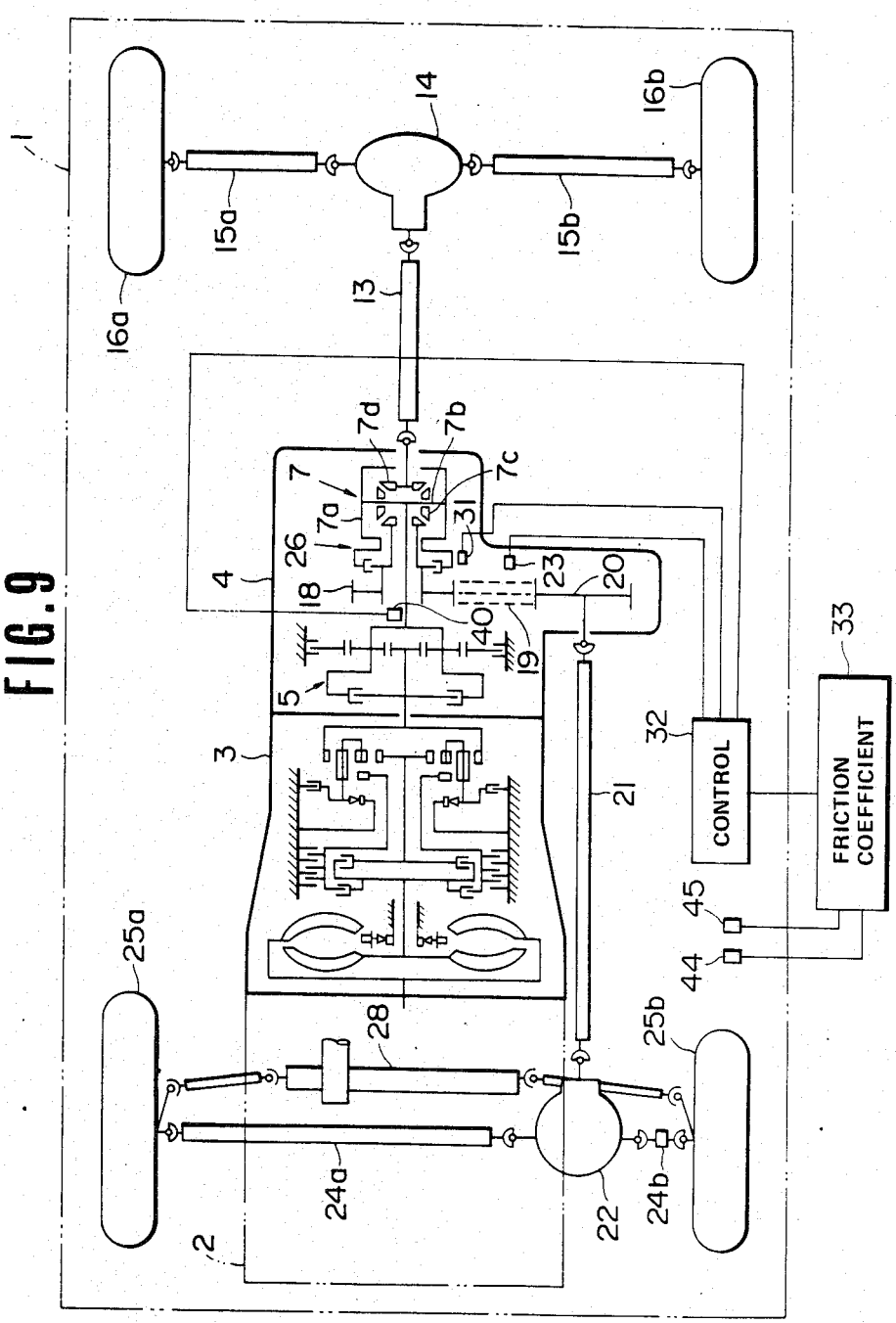
FIG. 9 is a schematic view of a four-wheel drive vehicle of a fourth embodiment of the present invention.

A fourth embodiment of the present invention is shown in FIG. 9. The fourth embodiment is different from the second embodiment in that the control system of the fourth embodiment has the vehicle speed sensor 40 in addition to the temperature sensor 44 and the humidity sensor 45. The control system of the fourth embodiment is arranged to prevent a change of the cornering characteristics at high vehicle speeds, as in the third embodiment. As shown in FIG. 10, the control unit 32 of the fourth embodiment is connected with the friction coefficient determining unit 33, the center differential condition sensor 31, and the vehicle speed sensor 40 to receive the signals from them. The control unit 32 sends the control signal to the actuator or solenoid 23 to restrain the center differential 7 only when the vehicle speed is equal to or lower than a predetermined value.

What is claimed is:

1. A four-wheel drive vehcile comprising
an engine,
front wheels and rear wheels,
a four-wheel drive system for transmitting power from said engine to said front wheels and said rear wheels, said four-wheel drive system comprising a center differential connected between said front wheels and said rear wheels for absorbing a rotational speed differential between said front wheels and said rear wheels, and differential restraining means capable of bringing said center differential into a restrained condition in which the function of said center differential is restrained, and
a control system comprising
  (i) friction coefficient sensing means for sensing a coefficient of friction between a road surface and a tire of at least one of said wheels independently of the rotational speed difference between said front wheels and said rear wheels and irrespectively of whether said front wheels and said rear wheels are allowed to rotate at different speeds by said center differential or not,
  (ii) condition sensing means for detecting whether said center differential is in or out of said restrained condition, and
  (iii) control means, connected with said friction coefficient sensing means and said condition sensing means, for controlling said center differential by actuating said differential restraining means in accordance with signals of said friction coefficient sensing means and said condition sensing means, said control means being arranged to command said differential restraining means to bring said center differential into said restrained condition if the sensed coefficient of friction is equal to or lower than a predetermined coefficient value and at same time said center differential is out of said restrained condition.

2. A vehicle according to claim 1, wherein said center differential comprises a front-side rotating member connected to said front wheels for driving said front wheels and a rear-side rotating member connected to said rear wheels for driving said rear wheels, said center differential being capable of allowing said front-side and rear-side rotating members to rotate at different speeds, wherein said differential restraining means is capable of holding said center differential in a locked condition included in said restrained condition, said front-side and rear-side rotating members being prevented from rotating at different speeds in said locked condition, wherein said condition sensing means detects whether said center differential is in or out of said locked condition, and wherein said control means is arranged to command said differential restraining means to bring said center differential into said locked condition if the sensed coefficient of friction is equal to or lower than the predetermined coefficient value and at the same time said center differential is out of said locked condition.

3. A vehicle according to claim 2, wherein said differential restraining means comprises a clutch operated by a fluid pressure, said clutch holding said center differential in said locked condition when said clutch is engaged.

4. A vehicle according to claim 3, wherein said control system is arranged to engage said clutch gradually by gradually changing the fluid pressure for operating said clutch.

5. A vehicle according to claim 4, wherein said clutch is slippingly engaged when the fluid pressure is in an intermediate range.

6. A vehicle according to claim 5, wherein said clutch is completely engaged when the fluid pressure is above the intermediate range, and disengaged when the fluid pressure is below the intermediate range, said differential restraining means further comprising actuating means capable of increasing and decreasing the fluid pressure, said control means being arranged to command said actuating means to increase the fluid pressure gradually if the sensed coefficient of friction is equal to or lower than the predetermined coefficient value and at the same time said center differential is out of said locked condition.

7. A vehicle according to claim 6, wherein said condition sensing means detects the condition of said center differential by monitoring the fluid pressure for operating said clutch.

8. A vehicle according to claim 7, wherein said front-side and rear-side rotating members are side gears, said center differential further comprising a differential case, and differential pinion gears which are mounted in said differential case and mesh with said side gears, said clutch being provided between said differential case and said front-side rotating member.

9. A vehicle according to claim 8, wherein said four-wheel drive system further comprises a front differential disposed between said front wheels, and a rear differential disposed between said rear wheels.

10. A vehicle according to claim 9, wherein said actuating means comprises a solenoid valve.

11. A vehicle according to claim 1, wherein said friction coefficient sensing means senses a coefficient of friction between a road surface and a tire of one of said front wheels which are steerable.

12. A vehicle according to claim 11, wherein said friction coefficient sensing means comprises steering angle sensing means for sensing a steering angle of at least one of said front wheels, vehicle speed sensing means for sensing the speed of the vehicle, load sensing means for sensing a force acting vertically on a contact surface between a road and the tire of at least one front wheel, and steering force sensing means for sensing a steering force for steering said steerable front wheels.

13. A vehicle according to claim 12, wherein said friction coefficient sensing means further comprises friction coefficient determining means connected with said steering angle sensing means, said vehicle speed sensing means, said load sensing means and said steering force sensing means, for determining the coefficient of friction from the steering angle, the vehicle speed, the load and the steering force sensed by these sensing means.

14. A vehicle according to claim 13, wherein said control means is connected with said vehicle speed sensing means, and arranged to command said differential restraining means to bring said center differential into said restrained coondition only when the sensed speed of the vehicle is equal to or lower than a predetermined speed value.

15. A vehicle according to claim 1, wherein said control system further comprises vehicle speed sensing means for sensing the speed of the vehicle, and said control means is connected with said vehicle speed sensing means and arranged to prevent said differential restraining means from bringing said center differential into said restrained condition when the sensed speed of the vehicle is in a high vehicle speed range higher than a predetermined speed value.

16. A four-wheel drive vehicle comprising
an engine,
front wheels and rear wheels,
a four-wheel drive system for transmitting power from said engine to said front wheels and said rear wheels for absorbing a rotational speed differential between said front wheels and said rear wheels, and differential restraining means capable of bringing said center differential into a restrained condition in which the function of said center differential is restrained, and
a control system comprising
(i) friction coefficient sensing means includng temperature sensing means for sensing an ambient temperature, humidity sensing means for sensing a humidity of an ambient air, and friction coefficient determining means, connected with said temperature sensing means and said humidity sensing means, for determining the coefficient of friction from signals of said temperature sensing means and said humidity sensing means,
(ii) condition sensing means for detecting whether said center differential is in or out of said restrained condition, and
(iii) control means, connected with said friction coefficient sensing means and said condition sensing means, for controlling said center differential by actuating said differential restraining means in accordance with signals of said friction coefficient sensing means and said condition sensing means, said control means being arranged to command said differential restraining means to bring said center differential into said restrained condition if the sensed coefficient of friction is equal to or lower than a predetermiend coefficient value and at the same time said center differential is out of said restrained condition.

17. A vehicle according to claim 16, wherein said temperature sensing means determines whether the ambient temperature is equal to or lower than a predetermined tempeature value, and said humidity sensing means determines whether the humidity of the ambient air is equal to or higher than a predetermined humidity value.

18. A vehicle according to claim 17, wherein said control system further comprises vehicle speed sensing means for sensing the speed of the vehicle, and said control means is connected with said vehicle speed sensing means and arranged to command said differential restraining means to bring said center differential into said restrained condition only when the sensed speed of the vehicle is equal to or lower than a predetermined speed value.

* * * * *